United States Patent
Everett et al.

(10) Patent No.: US 8,047,905 B2
(45) Date of Patent: Nov. 1, 2011

(54) METHOD, ARRANGEMENT AND APPARATUS FOR FACILITATING ENVIRONMENTAL CLIMATE CONTROL OF A BUILDING STRUCTURE

(76) Inventors: Steve Eugene Everett, Austin, TX (US); Jay Dean Everett, Austin, TX (US)

(*) Notice: Subject to any disclaimer, the term of this patent is extended or adjusted under 35 U.S.C. 154(b) by 1383 days.

(21) Appl. No.: 11/386,350

(22) Filed: Mar. 22, 2006

(65) Prior Publication Data
US 2007/0056304 A1    Mar. 15, 2007

Related U.S. Application Data

(60) Provisional application No. 60/716,905, filed on Sep. 14, 2005.

(51) Int. Cl.
*B01L 1/04* (2006.01)
*F24J 3/08* (2006.01)
*E04B 7/00* (2006.01)

(52) U.S. Cl. ............... 454/187; 165/45; 62/260; 52/198

(58) Field of Classification Search .................. 454/187; 165/45, 48.2; 62/260, 259.1; 52/198, 199, 52/220.1, 302.1, 302.4, 607
See application file for complete search history.

(56) References Cited

U.S. PATENT DOCUMENTS

| | | | |
|---|---|---|---|
| 4,227,566 A * | 10/1980 | Stilber | 165/45 |
| 4,373,573 A * | 2/1983 | Madwed | 165/236 |
| 4,384,609 A | 5/1983 | Neuzil | |
| 4,393,861 A * | 7/1983 | Beard et al. | 126/620 |
| 4,476,921 A * | 10/1984 | Stubbolo | 165/48.1 |
| 4,565,044 A * | 1/1986 | Takahara | 52/745.01 |
| 4,674,561 A | 6/1987 | Kelley | |
| 6,293,120 B1 | 9/2001 | Hashimoto | |
| 6,810,945 B1 | 11/2004 | Boissevain | |

FOREIGN PATENT DOCUMENTS

JP    08189102 A   *   7/1996

OTHER PUBLICATIONS

Abstract translation of jp document.*
Abstract translation of jp 08189102 A, dated Jul. 1996 document.*

* cited by examiner

*Primary Examiner* — Steve McAllister
*Assistant Examiner* — Kosanovic Helena
(74) *Attorney, Agent, or Firm* — David O. Simmons

(57) ABSTRACT

A building structure includes means to utilize solar radiation to heat the building structure during relatively cold ambient environmental conditions and to cool the building structure during relatively hot ambient environmental conditions. The building structure includes chambered wall and floor constructions having integral heat sink masses. These integral heat sink masses provide for radiation of heat when air temperature in an interior space of the building structure is below a temperature of the heat sink masses and for absorption of heat when the air temperature in the interior space of the building structure is above a temperature of the heat sink masses. A flow of thermally treated air to the heat sink masses serves to regulate the temperature of the heat sink masses.

12 Claims, 6 Drawing Sheets

METHOD, ARRANGEMENT AND APPARATUS FOR FACILITATING ENVIRONMENTAL CLIMATE CONTROL OF A BUILDING STRUCTURE

CROSS REFERENCE TO RELATED APPLICATIONS

This patent application claims priority to co-pending U.S. Provisional Patent Application having Ser. No. 60/716,905 filed Sep. 14, 2005 entitled "METHOD FOR PASSIVE COOLING AND HEATING OF A STRUCTURE", having a common applicant herewith and being incorporated herein in its entirety by reference.

FIELD OF THE DISCLOSURE

The disclosures made herein relate generally to methods and systems for facilitating climate control of building structures and, more particularly, controlling the climate of a building structure using geothermal climate control techniques, passive climate control techniques and building materials providing heat sink functionality.

BACKGROUND

Traditionally, to maintain the temperature inside a building structure, one has had to rely on costly and sometimes inefficient air conditioning and heating systems. In general, such traditional systems function by heating or cooling air to produce treated air (e.g., heated air relative to indoor ambient air temperature or cooled air relative to indoor ambient air temperature). This treated air is then circulating through the building structure so as to adjust the air temperature within the building structure. While relatively effective, rising energy costs and a growing interest in renewable energy and conservation have served to illustrate the high operating costs associated with this type of traditional heating and cooling systems.

It is known that Adobe and other similar types of composite building materials offer considerable benefits with respect to energy conservation and climate control. Adobe and other similar types of composite building materials serve as a natural heat barrier and thermal heat sink. Accordingly, the use of Adobe and such other similar types of composite building materials are becoming more accepted, if not preferred, types of building materials. Furthermore, with a growing global trend towards environmentally friendly construction methods and materials, Adobe and composite soil building materials are becoming increasingly attractive options for building structures of all types in a wide range of geographic locations.

Therefore, an approach for using geothermal, solar and passive climate control techniques in combination with building materials that are configured for offering natural heat barrier and thermal heat sink functionality would be useful and advantageous.

SUMMARY OF THE DISCLOSURE

Cooling and heating an interior space of a building structure without total dependence on mechanical means, electrical means and/or combustible gas means is advantageous and desirable. For example, by utilizing naturally occurring thermal radiation from solar power in tandem with a natural earth or composite soil construction and integral heat sink masses, a building structure can be maintained at a comfortable temperature during the day or night, largely regardless of seasonal changes. Embodiments of the present invention provide for such an approach for affecting the environmental climate of an interior space of the building structure.

The present invention provides a method for constructing a structure through the use of modular building units (e.g., building blocks, bricks, etc.), which when assembled into the building structure provide a flooring support structure and a wall structure that each have a plurality of passages therein through which air is allowed to move freely. The modular building units are of such design and composition as to collect heat (i.e., serve as heat sink masses). The present invention utilizes a series of underground cooling batteries (i.e., underground heat exchangers) that are used to cool air passing therethrough. It is well known and well documented that subterranean temperature of the earth (i.e., as little as a few inches below the soil line) is reliably cooler than the surrounding ambient air temperature. In many locations, the subterranean temperature is often as low as 50-degrees Fahrenheit during summer months even though the air temperature is much higher.

The present invention utilizes natural convection caused by solar radiation impinged upon the building structure's roof in order to heat the air within air passages of a roof structure of the building structure. The roof structure air passages are connected to air passages within the wall structure of the building structure, which are in turn connected to air passages in the flooring support structure. The air passages in the flooring support structure are connected to the underground heat exchangers. When such air in the roof structure air-passages is heated by solar radiation, natural convection creates a draft that causes the air to circulate through the cooling battery and through passages in the floor support structure and the wall structure in order to cool the interior space of the building structure and thermally-condition the heat sink mass of the flooring support structure and the wall structure. In a similar fashion, the present invention provides a means to utilize solar radiation to heat the building structure during colder seasons by routing solar-heated air through the air passages in the flooring support structure, wall structure and roof structure.

In one embodiment of the present invention, a method for affecting an environmental climate within a building structure is provided. The method comprises a plurality of operations. An operation is performed for providing a building structure having a flooring support structure, a wall structure attached to the flooring support structure and a roof structure attached to the wall structure such that an interior space is defined therebetween. The wall structure includes a heat sink mass and an exterior insulating layer attached to the heat sink mass. An operation is performed for supplying thermally-treated air to a passage in the flooring support structure. An operation is performed for directing the thermally treated air from the air passage in the flooring support structure into an air passage in the wall structure and from the air passage in the wall structure into an air passage in the roof structure such that a flow of air through the flooring support structure, the wall structure and the roof structure is provided and such that directing thermally-treated air through the passage of the wall structure causes heat transfer between the heat sink mass of the wall structure and the thermally-treated air.

In another embodiment of the present invention, an arrangement of a climate controlled building structure comprises a building structure including a flooring support structure, a wall structure and a roof structure. The flooring support structure, the wall structure and the roof structure are interconnected such that they jointly define an interior space encompassed thereby. The wall structure includes a heat sink mass and an exterior insulating layer attached to the heat sink mass. The arrangement further comprises an air passage extending contiguously through the heat sink mass of the wall structure, through the floor support structure and through the roof structure. The air passage has an inlet within the flooring support structure and an outlet within the roof structure. The arrangement further comprises an air distribution structure having an air inlet and an air outlet. The air distribution structure outlet is connected with the air passage inlet in the flooring support structure. The arrangement further comprises an air treatment apparatus including an air outlet connected to the air distribution structure inlet thereby enabling treated air to be supplied from the air treatment apparatus to the air distribution structure such that the treated air passes through the air passage.

In another embodiment of the present invention, a climate control apparatus for a building structure comprises a flooring support structure, a wall structure, a roof structure and a plurality of underground heat exchangers. The flooring support structure includes a plurality of flooring support structure units in side-by-side relationship. Each one of the flooring support structure units has an air passage therein and the air passage of adjacent ones of the flooring support structure units are at least partially aligned so as to form an air passage extending through the flooring support structure. The wall structure includes a plurality of interconnected wall structure units. Each one of the wall structure units includes an air passage feature such that the air passage feature of adjacent ones of the wall structure units jointly form an air passage extending at least partially along a height of the wall structure. A bottom portion of the wall structure is engaged with the flooring support structure and the air passage of the wall structure is interconnected with the air passage of the flooring support structure. The roof structure includes an air passage extending at least partially therethrough. The roof structure is engaged with a top portion of the wall structure and the air passage of the roof structure is interconnected with the air passage of the wall structure. The plurality of underground heat exchangers are each configured for having air passed therethrough and for extracting heat from the air. An air outlet of a first one of the underground heat exchangers is exposed within a space jointly encompassed by the flooring support structure, the wall structure and the roof structure. An air inlet of a second one of the underground heat exchangers is exposed within the space jointly encompassed by the flooring support structure, the wall structure and the roof structure. An air outlet of the second one of the underground heat exchangers is interconnected with at least one of the air passage of the flooring support structure and the air passage of the wall structure.

Turning now to specific aspects of the present invention, in at least one embodiment, supplying thermally-treated air includes supplying thermally-treated air to the air passage in the wall structure.

In at least one embodiment of the present invention, supplying thermally treated air includes selectively routing air through at least one underground heat exchanger and/or selectively routing air through a solar heat exchanger.

In at least one embodiment of the present invention, selectively routing air through at least one underground heat exchanger includes routing air through two underground heat exchangers, wherein a first one of the underground heat exchangers receives inlet air from within an interior space of the building structure and discharges thermally-treated air to the passage in the flooring support structure and wherein a second one of the underground heat exchangers receives inlet air from at least one of within the interior space of the building structure and a location outside of the interior space of the building structure and discharges thermally-treated air within the interior space of the building structure.

In at least one embodiment of the present invention, selectively routing air through a solar heat exchanger includes the solar heat exchanger receiving inlet air from within the interior space of the building structure and discharging thermally-treated air within at least one of the passage in the flooring support structure and the passage in the wall structure.

In at least one embodiment of the present invention, directing the thermally-treated air includes discharging the thermally-treated air to an ambient atmosphere in conjunction with selectively routing air through the at least one underground heat exchanger and discharging the thermally-treated air to the interior space of the building structure in conjunction with selectively routing air through the solar heat exchanger, wherein the discharging is performed after the thermally-treated air passes through the air passage in the roof structure.

In at least one embodiment of the present invention, an air treatment apparatus includes a first heat exchanger system configured for extracting heat from air and a second heat exchanger system configured for adding heat to air.

In at least one embodiment of the present invention, an air discharge assembly is connect to the air passage outlet, wherein the air discharge assembly is operable for enabling the treated air to be selectively discharged from the air passage to the ambient atmosphere and to the interior space.

In at least one embodiment of the present invention, the first heat exchanger system includes a upstream underground heat exchanger and an upstream valve mechanism connected to the upstream underground heat exchanger for selectively enabling and disabling the flow of air through the upstream underground heat exchanger and includes a downstream underground heat exchanger and a downstream valve mechanism connected to the downstream underground heat exchanger for selectively enabling and disabling the flow of air through the downstream underground heat exchanger.

In at least one embodiment of the present invention, the second heat exchanger system includes a solar heat exchanger and a solar heat exchanger valve mechanism connected to the solar heat exchanger for selectively enabling and disabling the flow of air through the solar heat exchanger.

In at least one embodiment of the present invention, each one of the underground heat exchangers includes an outer housing, an air tube within the outer housing, heat sink material at least partially surrounding the air tube within the housing and a heat conductive liquid covering at least a portion of the air tube and the heat sink material.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
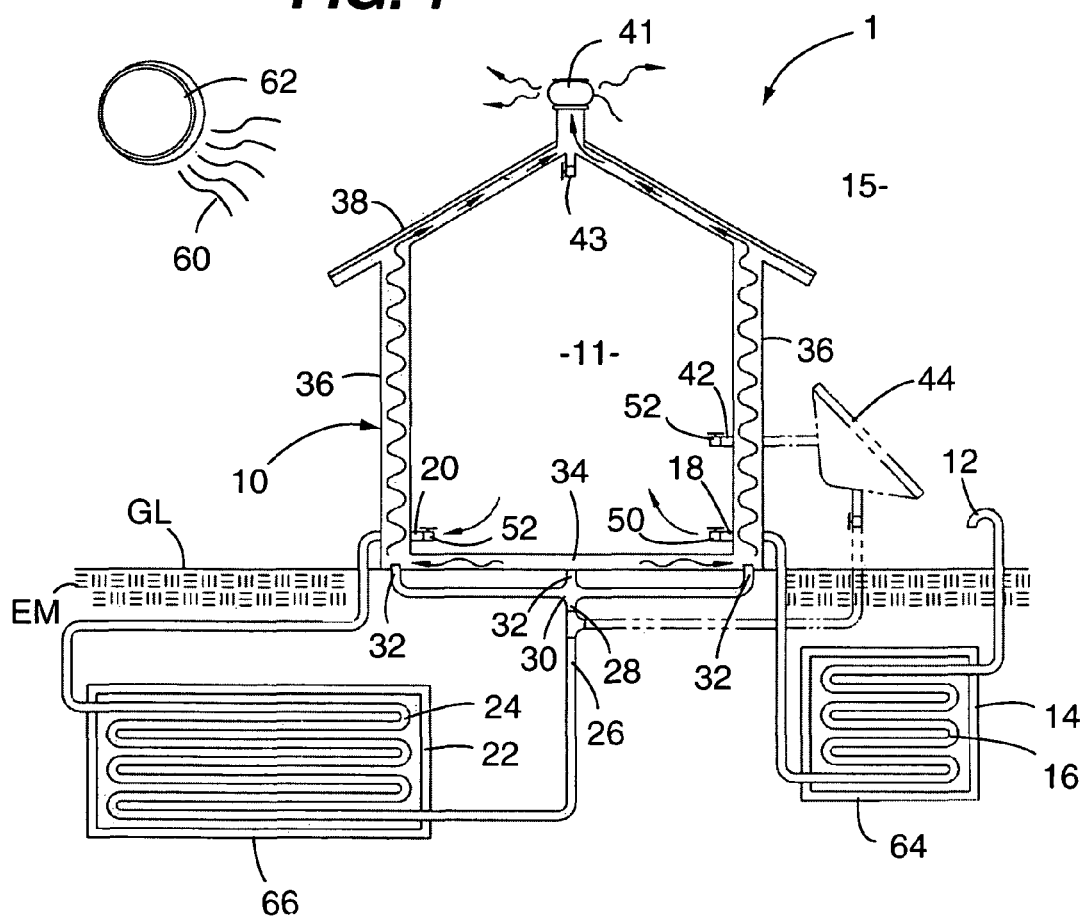
FIG. 1 is a diagrammatic view of a climate controlled building structure arrangement depicting implementation of a method configured for cooling an interior space of a building structure in accordance with the present invention.
Figure 2:
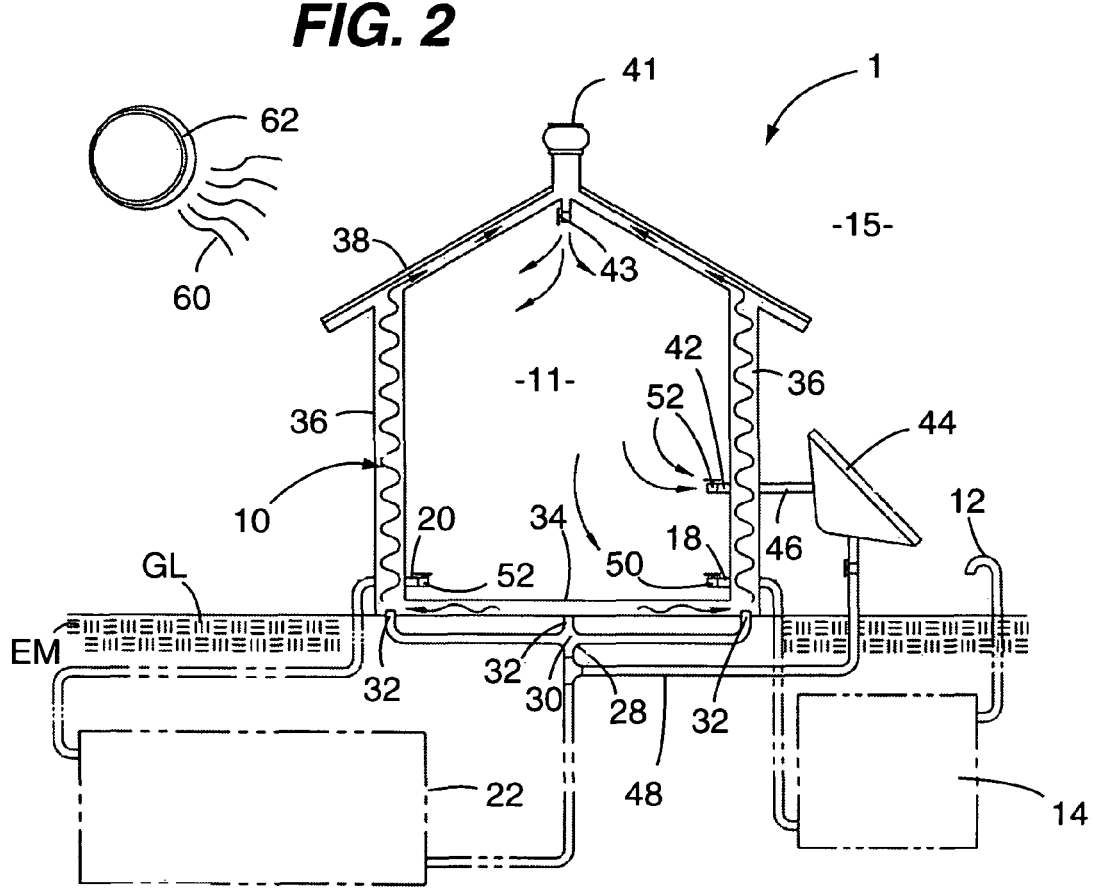
FIG. 2 is a diagrammatic view of the climate controlled building structure arrangement of FIG. 1 depicting implementation of a method configured for heating the interior space of the building structure in accordance with the present invention.

FIGS. 1 and 2 show a climate controlled building structure arrangement in accordance with the present invention, which is referred to herein as the climate controlled building structure arrangement 1. In FIG. 1, the climate controlled building structure arrangement 1 is shown depicting implementation of a method configured for cooling an interior space 11 of a building structure 10 of the climate controlled building structure arrangement 1. In FIG. 2, the climate controlled building structure arrangement 1 is shown depicting implementation of a method configured for heating the interior space 11 of the building structure 10. In FIG. 1, elements of a heating airflow circuit of a climate control apparatus in accordance with the present invention are shown as being deactivated (i.e., dashed lines). In FIG. 2, elements of a cooling airflow circuit of a climate control apparatus in accordance with the present invention are shown as being deactivated (i.e., dashed lines).

Referring to FIG. 1, the cooling airflow circuit of the climate controlled building structure arrangement 1 has the following airflow path. Air enters an air inlet 12 of an upstream underground heat exchanger 14 from an ambient environment 15. After entering the air inlet 12 of the upstream underground heat exchanger 14, the air passes through an air tube 16 of the upstream underground heat exchanger 14 and is discharged from an air outlet 18 of the upstream underground heat exchanger 14 into the interior space 11. Air within the interior space 11 enters an air inlet 20 of a downstream heat exchanger 22. After entering the air inlet 20 of the downstream underground heat exchanger 22, the air passes through an air tube 24 of the downstream underground heat exchanger 22 and is discharged from an air outlet 26 of the downstream underground heat exchanger 22 into an air inlet 28 of an air distribution manifold 30 (i.e., an air distribution structure). The air distribution manifold 30 includes a plurality of air outlets 32. A first portion of the air outlets 32 are interconnected with an air passage of a flooring support structure 34 of the building structure 10 and a second portion of the air outlets 32 are interconnected with an air passage of a wall structure 36 of the building structure 10. After being discharged from the air tube 24 of the downstream underground heat exchanger 14 into the into the air inlet 28 of the air distribution manifold 30, the air passes through the air distribution manifold 30 and is discharged from the air distribution manifold 30 into the passages of the flooring support structure 34 and the wall structure 36. The air passage of the flooring support structure 34 is connected to the air passage of the wall structure 36, such that the air discharged into the flooring support structure 34 passes through the air passages in the flooring support structure 34 and into the air passage of the wall structure 36. The air passage of the wall structure 36 is connected to an air passage of a roof structure 38, such that air within the wall structure 36 passes from the passage in the wall structure 36 into the air passage of the roof structure 38. The air then passes through the air passage of the roof structure 38 and is discharged from the air passage in the roof structure 38 into the ambient environment 15 through an air discharge assembly 41.

The air discharge assembly 41 is mounted on the roof structure 18 (i.e., a sloped roof structure) at a vertical position higher than where the wall structure 36 is connected to the roof structure 38. The air discharge assembly 41 includes an adjustable valve 43 that is selectively operable for enabling air passing through the air discharge assembly 41 to be discharged to the ambient atmosphere 15 (i.e., in a cooling mode of operation) or into the interior space 11 (i.e., in a heating mode of operation). In one embodiment, the air discharge assembly 24 is a passive vent system, which is particularly useful in sloped roof applications. In another embodiment, the air discharge assembly 24 is an active vent system including an electromotive device such as a fan to promote airflow through the air discharge assembly 24, which is particularly useful in horizontal roof applications as a convection-induced draft is less pronounced in such a roof structure or when solar intensity is insufficient to provide required/desired airflow through the cooling airflow circuit or heating airflow circuit.

As shown in FIG. 1, the air inlet 12 is exposed to ambient air outside of the interior space 11 of the building structure 10, thus allowing ambient air to be drawn into the cooling circuit. It is disclosed herein that, alternatively, the air inlet 12 may be exposed to the interior space 11 (e.g., just below the roof structure 38) and/or the air passage of the wall structure 36. Such an alternative embodiment provides for re-circulation of the conditioned air from the air passage of the wall space and/or the interior space 11 thus enhancing system operating efficient over time.

Referring to FIG. 2, the heating airflow circuit of the climate controlled building structure arrangement 1 has the following airflow path. Air enters an air inlet 42 of a solar heat exchanger 44. The air inlet 42 is exposed within the interior space 11. After entering the air inlet 42 of the solar heat exchanger 44, the air passes through an air tube 46 of the solar heat exchanger 14 and is discharged from an air outlet 48 of the solar heat exchanger 44 into the air inlet 28 of the air distribution manifold 30. After being discharged from the air tube 46 of the solar heat exchanger 44 into the into the air inlet 28 of the air distribution manifold 30, the air passes through the air distribution manifold 30 and is discharged from the air distribution manifold 30 into the passages of the flooring support structure 34 and the wall structure 36. The air discharged into the flooring support structure 34 passes through the air passages in the flooring support structure and into the air passage of the wall support structure 36. The air within the wall structure 36 passes from the passage in the wall structure 36 into the air passage of the roof structure 40. The air then passes through the air passage of the roof structure 40 and is discharged from the air passage in the roof structure 40 into the interior space 11 through the air discharge assembly 41.

As mentioned above, the heating airflow circuit and cooling airflow circuit may be activated and deactivated. More specifically, when the cooling airflow circuit is activated, the heating airflow circuit is typically deactivated and vice-versa. In one embodiment, control valves are used for facilitating such activation and deactivation. As shown in FIGS. 1 and 2, a valve 50 is provided in-line with the upstream underground heat exchanger 14, a valve 52 is provided in-line with downstream underground heat exchanger 22 and a valve 54 is provided in-line with the solar heat exchanger 44. Activation and deactivation of the cooling airflow circuit and the heating airflow circuit is facilitated by relative positioning of the valves (50-54). In a cooling mode of operation, the valve 54 in-line with the solar heat exchanger is closed and the valves (50, 52) in-line with the underground heat exchangers (14, 22) are open. In a heating mode of operation, the valve 54 in-line with the solar heat exchanger is open and the valves (50, 52) in-line with the underground heat exchangers (14, 22) are closed. It is disclosed herein that opening and closing of the valves (50-54) may be facilitated by any number of means such as, for example, an thermostatic control system, individual thermostatic devices attached to each one of the valves (50-54), or manual control.

Figure 3:
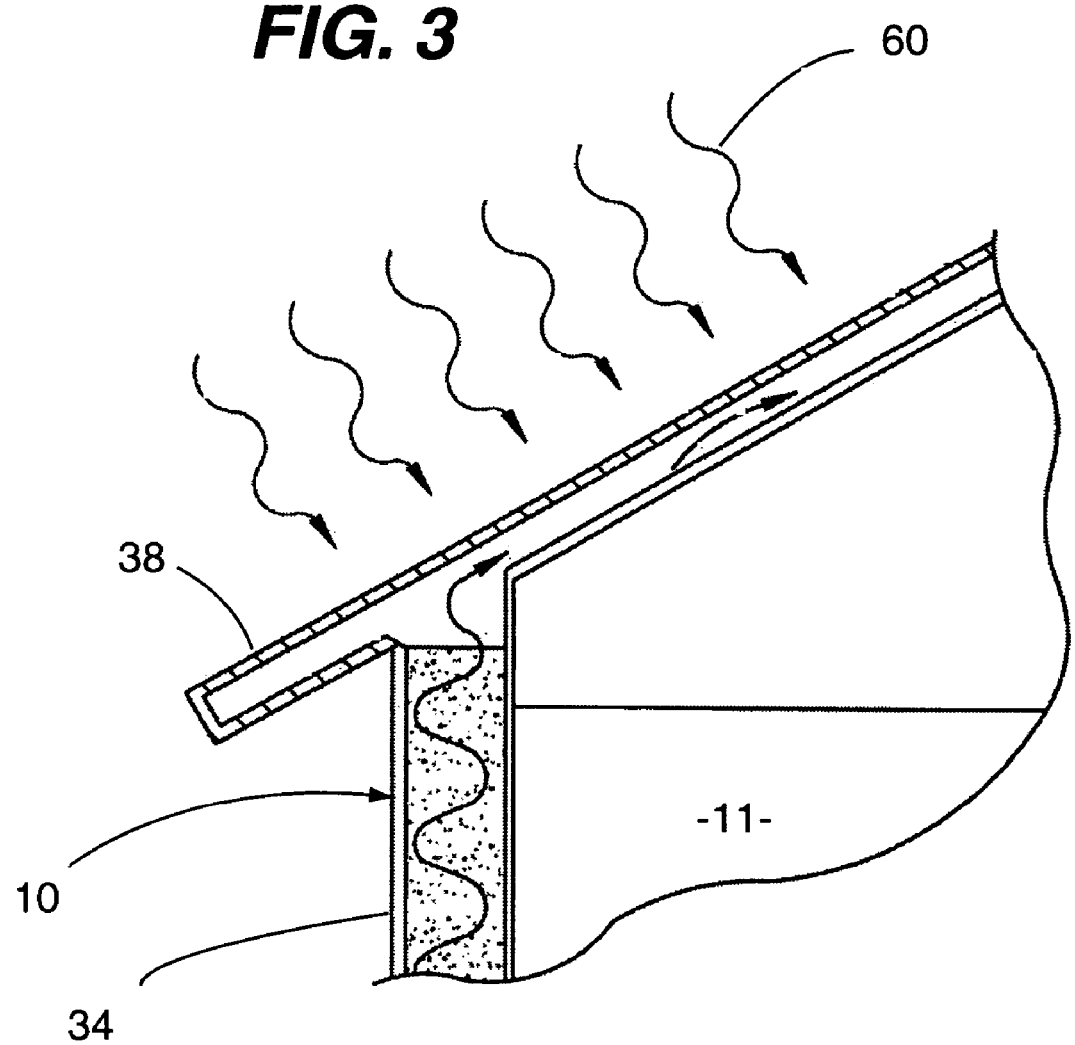
FIG. 3 is a fragmentary diagrammatic view of a roof structure and wall structure of the climate controlled building structure arrangement of FIG. 1.

Referring to FIGS. 1 and 3, a discussion on implementation of a method configured for cooling the interior space 11 of the building structure 10 will be presented. Such a method for cooling is supported by impingement of ultraviolet (UV) rays 60 from sun 62 upon the roof structure 38 of the building structure 10. Impingement of the UV rays 60 results in an increase in a temperature of air the air passage of the roof structure 38 thereby producing heated air within the air passage of the roof structure 18 relative to temperature of air in the air passages of the wall structure 36 and the flooring support structure 34:. As a result of the principle of thermal convection, the heated air within the air passage of the roof structure 38 flows upward along a length of the air passage in the roof structure 38 due to the increased temperature of the air resulting in a reduction in its density. With the adjustable valve 43 of the air discharge assembly adjusted to provide for the heated air in the roof structure 18 to discharge to the ambient atmosphere 15, a draft is created within the roof structure 18 as the heated air in the air passage of the roof structure 18 rises through the air passage in the roof structure 18 and discharges through the air discharge assembly 41 into the ambient atmosphere 11.

The expansion of the heated air in the air passage of the roof structure 38 due to the impingement of UV rays 60 and the associated upward flow of such heated air (i.e., relatively less dense air) within the air passage of the roof structure 38 results in a pressure differential between the air passage of the roof structure and air within the ambient atmosphere (i.e., relatively low pressure in the air passage of the roof structure 38). Accordingly, this pressure differential results in ambient air being forced into the air inlet 12 of the upstream underground heat exchanger 14 thereby creating airflow through the cooling airflow circuit.

The upstream underground heat exchanger 14 and the downstream underground heat exchanger 22 serve to extract heat from air passing through the cooling airflow circuit. The underground heat exchangers (14, 22) are effectively cooling batteries that use the thermal mass of the earth to facilitate heat transfer. The upstream underground heat exchanger 14 extracts heat from air that is delivered to the interior space 11 of the building structure. The downstream underground heat exchanger 22 extracts heat from air that is delivered to the air passages of the flooring support structure 34 and the wall structure 36. Through such heat extraction, the air delivered to the air passages of the flooring support structure 34 and the wall structure 36 serve to cool the flooring support structure 34 and the wall structure 36 (i.e., the thermal mass thereof), thereby providing a means by which an interior space defined by the flooring support structure 34, the wall structure 36 and the roof structure may be cooled and maintained at a cooler temperature than that of the surrounding ambient atmosphere.

Figure 4:
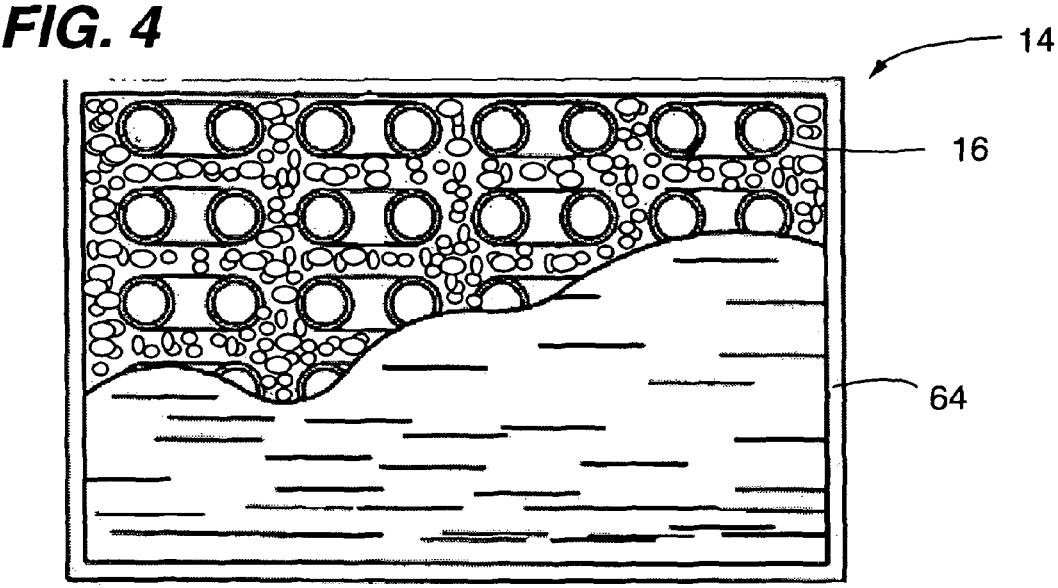
FIG. 4 is a cut away view of an underground heat exchanger in accordance with the present invention.
Figure 5:
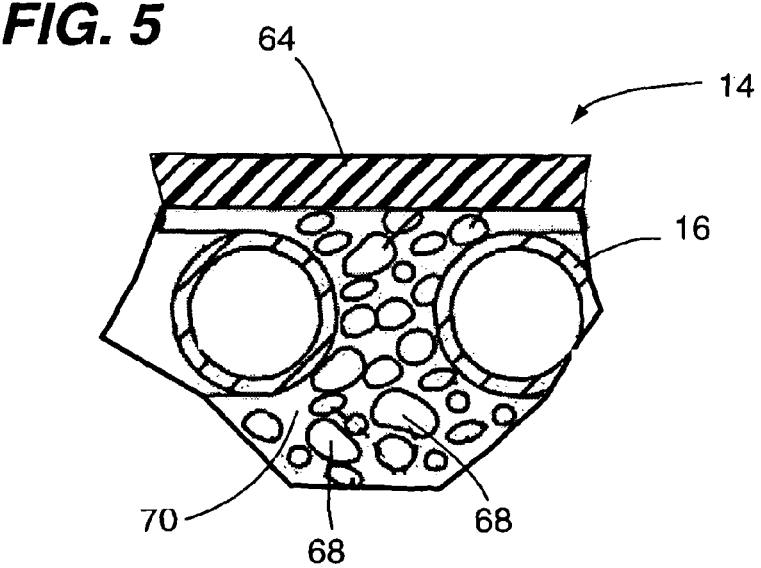
FIG. 5. is a cross-sectional fragmentary view of the underground heat exchanger in FIG. 4.

The underground heat exchangers (14, 22) are located at a moderate depth below ground level GL. The underground heat exchangers (14, 22) each include an outer housing 64 through which the air tube (16, 24) of the respective one of the underground heat exchangers (14, 22) is routed. As depicted in FIGS. 1 and 2, the air tubes (16, 24) of the underground heat exchangers (14, 22) are a series of hollow coils, thereby providing an airspace through which air flows through the underground heat exchangers (14, 22). In alternate embodiments, the air tubes (16, 24) have other configurations while still providing the same overall functionality (i.e., providing an airspace through which air flows). The outer housing 64 of each one of the underground-heat exchangers (14, 22) is generally enclosed and preferably constructed from a rigid and waterproof material. As shown in FIGS. 4 and 5, within the outer housing 64 of an underground heat exchanger in accordance with the present invention (i.e., upstream underground heat exchanger 14 shown in FIGS. 4 and 5), a heat sink material 68 at least partially surrounds the air tube 16 and a heat conductive liquid 70 covers at least a portion of the respective air tube 16 and the heat sink material 68. An aggregate material (e.g., rocks or pebbles) is an example of the heat sink material 68 and water is an example of the heat conductive liquid 70. Accordingly, the outer housing 64 of each one of the underground heat exchangers (14, 22) must be of sufficient design, size and strength to support applied internal and external loadings.

As air enters the air tube (16, 24) of each one of the underground heat exchangers (14, 22), heat from the air is dissipated through the air tubes (16, 24) into the heat sink material 68 and the heat conductive liquid 70. The volume and thermal load characteristics of the heat sink material 68 and the heat conductive liquid 70, as well as earthen material EM surrounding the outer housing 64, causes heat to be efficiently and expeditiously conducted away from the air and into the heat sink material 68 and the heat conductive liquid 70. Thereafter, the extracted heat is conducted into the earthen material EM from the heat sink material 68 and the heat conductive liquid 70. Through such conduction of heat, the temperature of air routed through the underground heat exchangers (14, 22) is reduced and the heat extracted from such air is released in to the earthen material EM surrounding each one of the underground heat exchangers (14, 22).

Referring to FIG. 2, a discussion on implementation of a method configured for heating the interior space 11 of the building structure 10 will be presented. Such a method for heating is supported by impingement of ultraviolet (UV) rays 60 from the sun 62 upon the solar heat exchanger 44. Through the use of the solar heat exchanger passive solar radiation is converted into heat energy, which is transferred to air passing through the air tube 46 of the solar heat exchanger 44. The solar heat exchanger 44 receives air from within the interior space 11 of the building structure 10 through an air inlet 42 of the solar heat exchanger 44. After being heated while passing through the air tube 46 of the solar heat exchanger 44, the now heated air flows from the air outlet 48 of the solar heat exchanger 44 into the air inlet 28 of the air distribution manifold 30 and is distributed accordingly into the passages the flooring support structure 34 and the wall structure 36. The heated air rises through the air passage in the wall structure 36 and flows into the air passage of the roof structure 38. As with the cooling mode of operation discussed above, UV rays impinging upon the roof structure heats the air in the air passages of the roof structure 38 thereby providing for convection-induced airflow through the heating circuit. The resultant convection-included airflow (i.e., convection currents) results in air within the air passage of the roof structure 38 being discharged through the air discharge assembly 41 into the interior space 11 of the building structure 10.

The flooring support structure 34 and the wall structure 36 are both constructed in a manner and from materials that allow them to serve as heat sink masses. Accordingly, the flow of thermally-treated air through passages in the flooring support structure 34 and the wall structure 36 influences the temperature of the flooring support structure 34 and the wall structure 36. Due to the heat sink mass of the flooring support structure 34 and the wall structure 36, the temperature of: the flooring support structure 34 and the wall structure 36 have a considerable influence of the air temperature within the interior space 11 of the building structure 10. For example, the temperature of the wall structure 36 and the flooring support structure 34 will remain near a daytime for quite some time after the sun 62 sets, which will serve to maintain the interior space 11 at a temperature closer to that of the wall structure 36 and the flooring support structure 34 for some time after the sun 62 sets. Such use of heat sink masses in combination with convention-induced temperature control is an important and advantageous aspect of the present invention.

Figure 6:
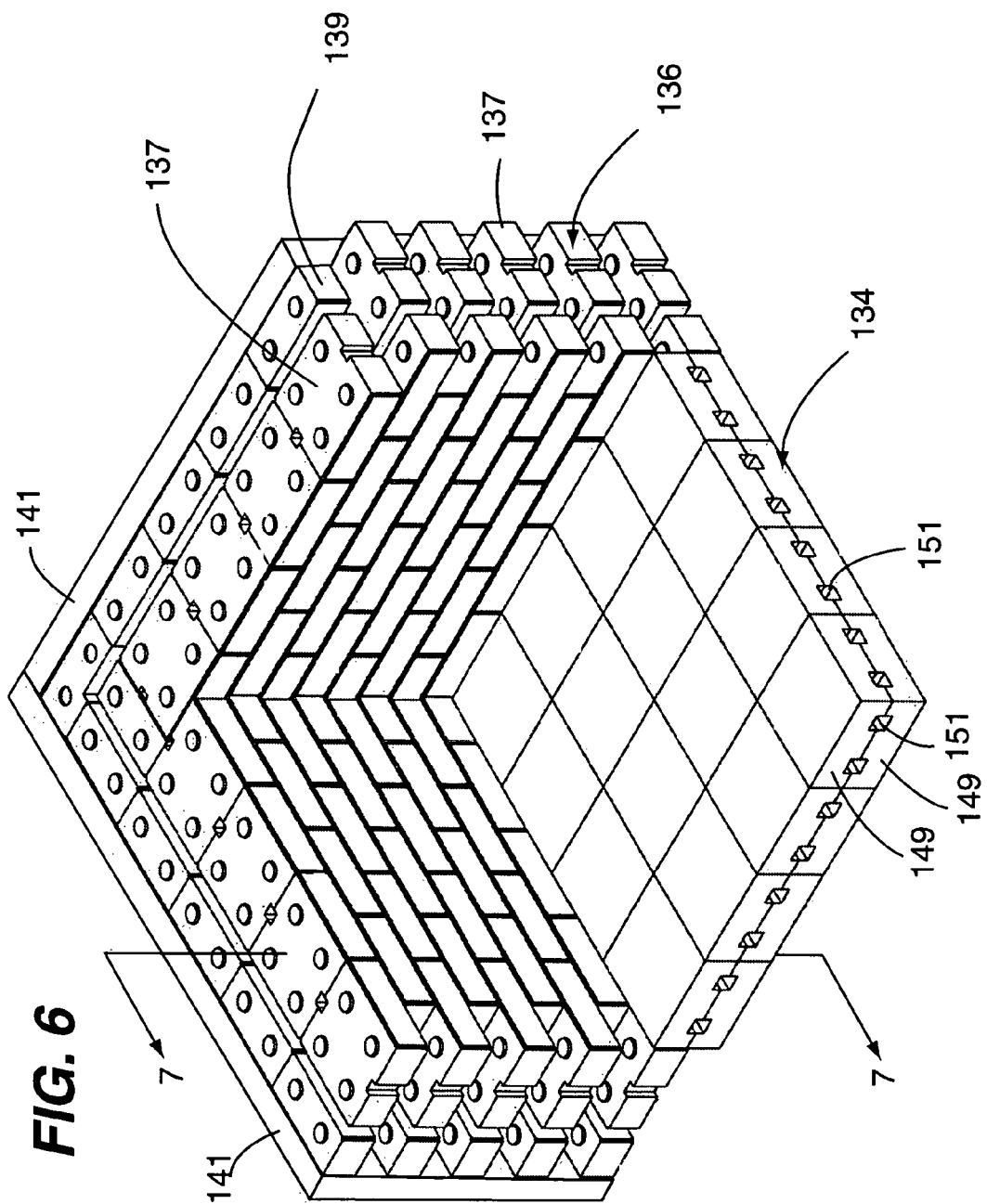
FIG. 6 is a perspective view showing a fabrication arrangement for a wall structure and flooring support structure in accordance with the present invention.
Figure 7:
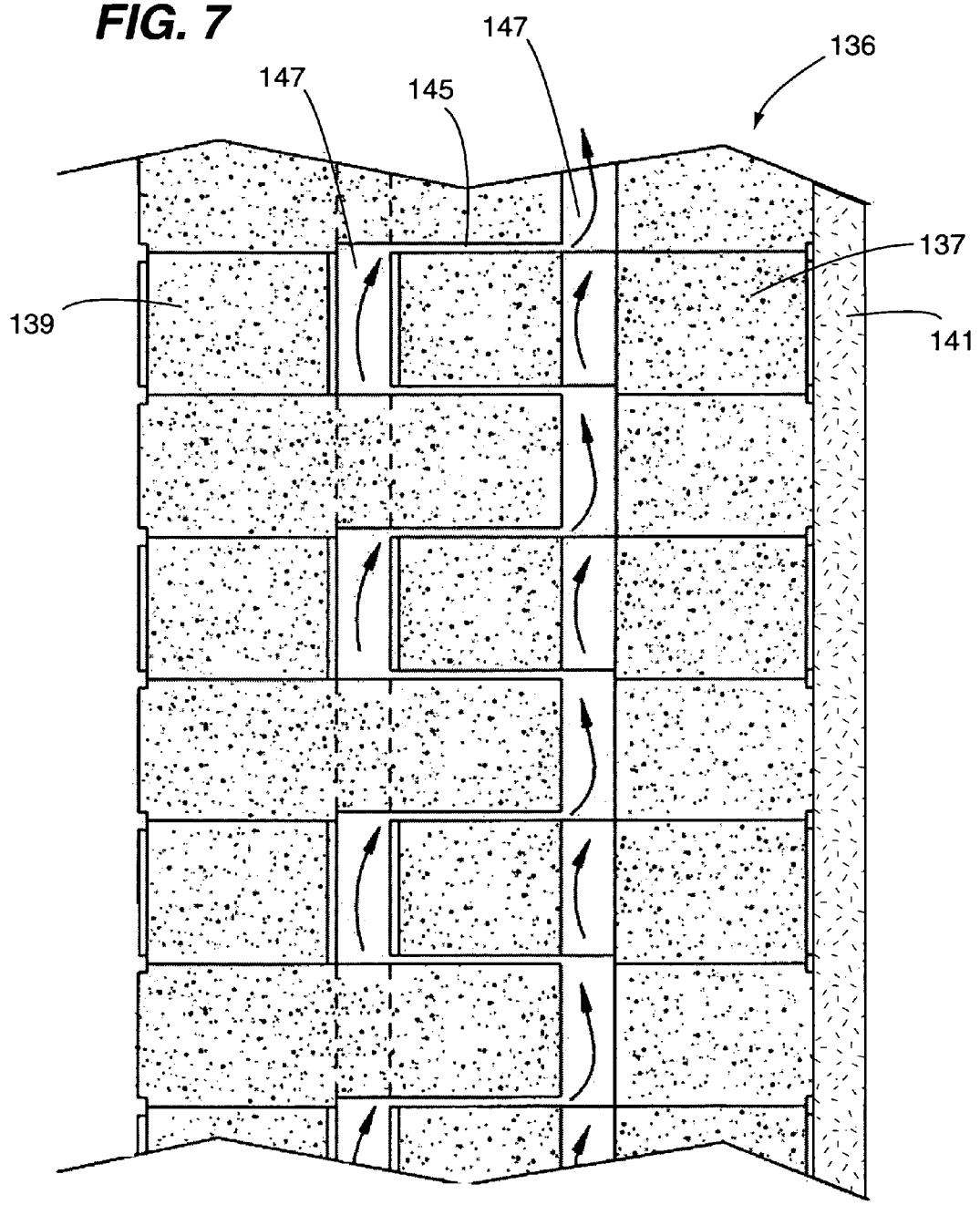
FIG. 7 is a cross-sectional view taken along the line 7-7 in FIG. 6.

FIG. 6 shows specific respective embodiments of a flooring support structure and a wall structure in accordance with the present invention (i.e., the wall structure 136 and the flooring support structure 134). The wall structure 136 is constructed from full-width wall bricks 137, half-width wall bricks 139 and an exterior insulating layer 141. Examples of the exterior insulating layer 141 include, but are not limited to, a material layer made from foam, stucco, plaster, mortar and/or the like. The wall bricks (137, 139) are stackable and interlocking. Furthermore, the wall bricks (137, 139) are made from a material and in a manner (e.g., adobe construction, concrete, etc) providing heat sink mass functionality. Heat sink properties in accordance with the present invention are defined herein to include an ability to maintain a nominal temperature for an extended period of time without the addition of heat from an external source and/or to have a large mass relative to a given volume. For example, an adobe brick, natural stone, concrete block and cement block are types of structural building units that exhibit a relatively high heat sink mass. As shown in FIG. 7, the full-width wall bricks 137 include a passage feature 143 that creates adjoining horizontal spaces 145 and vertical spaces 147 when the wall bricks (137, 139) are stacked. An air passage extending along the height of the wall structure 136 is formed by the adjoining horizontal spaces 145 and vertical spaces 147.

Referring to FIG. 6, the flooring support structure 134 is constructed from floor bricks 149. Pairs of floor bricks 149 are stacked in an inverted manner. Each floor brick has an air passage feature 151 in a mating face thereof, such that an air passage extends through each pair of stacked floor bricks 149. The pairs of floor bricks 149 are positioned in side-by side relationship such that the air passage of adjacent pairs of the floor bricks are at least partially aligned, thus providing an air passage extending through the flooring support structure 134. A portion of the air passage in the flooring support structure 134 is interconnected with a portion of the air passages in the wall structure 136. An opening (not shown) in a bottom face of one of more of the pair of stacked floor bricks 149 is provided for enabling air to be provided thereto from an air distribution manifold in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An arrangement of a climate controlled building structure, comprising:

a building structure including a flooring support structure, a wall structure and a roof structure, wherein the flooring support structure, the wall structure and the roof structure are interconnected such that they jointly define an interior space encompassed thereby, wherein the flooring support structure is bordered by the wall structure, wherein an upper face of the flooring support structure spans between said wall structure thereby defining a boundary of the interior space at its lower region, and wherein the wall structure includes a heat sink mass and an insulating layer attached to the heat sink mass such that the heat sink mass is located between the insulating layer and the interior space;

an air passage extending contiguously through the heat sink mass of the wall structure, through the floor support structure and through the roof structure, wherein the air passage has an inlet within the flooring support structure and an outlet within the roof structure, wherein the air passage includes a plurality of discrete air passage paths formed within the wall structure, within the floor support structure and within the roof structure, wherein the flooring support structure is constructed from a plurality of stacked floor support structure units, wherein pairs of said floor support structure units are in a stacked arrangement such that mating faces of said pairs of said stacked floor support structure units mate with each other, wherein an air passage channel is provided within a mating face of at least one of said pairs of stacked floor support structure units thereby providing a respective air passage path portion extending therebetween, and wherein said floor support structure units are positioned in a side-by-side arrangement such that the respective air passage path portion of adjacent ones of said pairs of floor support structure units jointly define a respective portion of said discrete air passage paths formed within the floor support structure;

an air distribution structure having an air inlet and an air outlet, wherein said air distribution structure outlet is connected with said air passage inlet in the flooring support structure; and an air treatment apparatus including an air outlet connected to said air distribution structure inlet thereby enabling treated air to be supplied from said air treatment apparatus to the air distribution structure such that said treated air passes through the air passage.

2. The arrangement of claim 1 wherein:

the air passage has an inlet within the wall structure;

the air outlet of the air distribution structure outlet is interconnected with the inlet of the air passage within the wall structure;

said discrete air passage paths formed within the wall structure each include a adjoining horizontal air passage segments and vertical air passage segments; and the respective air passage path portion of each one of said floor support structure units includes a first segment thereof extending in a first direction and a second segment extending in a second direction generally perpendicular to the first direction.

3. An arrangement of a climate controlled building structure comprising:

a building structure including a flooring support structure, a wall structure and a roof structure, wherein the flooring support structure, the wall structure and the roof structure are interconnected such that they jointly define an interior space encompassed thereby, wherein the flooring support structure is bordered by the wall structure such that the interior space is bounded at its lower region by the flooring support structure, and wherein the wall structure includes a heat sink mass and an insulating layer attached to the heat sink mass such that the heat sink mass is located between the insulating layer and the interior space;

an air passage extending contiguously through the heat sink mass of the wall structure, through the floor support structure and through the roof structure, wherein the air passage has an inlet within the flooring support structure and an outlet within the roof structure, wherein the air passage includes a plurality of discrete air passage paths formed within the wall structure, within the floor support structure and within the roof structure, wherein the floor support structure includes a plurality of floor support structure units each including a respective air passage path portion extending therein between upper and lower surfaces thereof, and wherein said floor support structure units are positioned in a side-by-side arrangement such that the respective air passage path portion of adjacent ones of said floor support structure units jointly define said discrete air passage path formed within the floor support structure;

an air distribution structure having an air inlet and an air outlet, wherein said air distribution structure outlet is connected with said air passage inlet in the flooring support structure;

an air treatment apparatus including an air outlet connected to said air distribution structure inlet thereby enabling treated air to be supplied from said air treatment apparatus to the air distribution structure such that said treated air passes through the air passage, wherein said air treatment apparatus includes a first heat exchanger system configured for transferring heat from air heated within the building structure to earthen material below a ground level of the building structure and a second heat exchanger system configured for heating air using solar energy prior to said air being delivered into the building structure; and an air discharge assembly connected to said air passage outlet, wherein the air discharge assembly is operable for enabling said treated air to be selectively discharged from the air passage to an ambient atmosphere and to the interior space and wherein the air discharge assembly is mounted on the roof structure at a vertical position higher than where the wall structure is connected to the roof structure.

4. The arrangement of claim 3 wherein:

the first heat exchanger system includes a upstream underground heat exchanger and an upstream valve mechanism connected to the upstream underground heat exchanger for selectively enabling and disabling the flow of air through the upstream underground heat exchanger and includes a downstream underground heat exchanger and a downstream valve mechanism connected to the downstream underground heat exchanger for selectively enabling and disabling the flow of air through the downstream underground heat exchanger; and the second heat exchanger system includes a solar heat exchanger and a solar heat exchanger valve mechanism connected to the solar heat exchanger for selectively enabling and disabling the flow of air through the solar heat exchanger.

5. The arrangement of claim 4 wherein each one of said underground heat exchangers includes an outer housing, an air tube within the outer housing, heat sink material at least partially surrounding the air tube within the housing and a heat conductive liquid covering at least a portion of the air tube and said heat sink material.

6. A climate control apparatus for a building structure, comprising:

a flooring support structure including a plurality of flooring support structure units in side-by-side relationship, wherein pairs of said floor support structure units are in a stacked arrangement such that mating faces of said pairs of stacked floor support structure units each mate with each other, wherein an air passage channel is provided within a mating face of at least one of said pairs of stacked floor support structure units thereby providing a respective air passage extending therebetween, wherein each one of said floor support structure units is constructed in a manner to provide heat sink properties characterized by an ability to maintain a nominal temperature for an extended period of time without the addition of heat from an external source, and wherein the respective air passage of adjacent ones of said pairs of stacked flooring support structure units are at least partially aligned so as to form an air passage extending through the flooring support structure;

a wall structure including a plurality of interconnected wall structure units, wherein each one of said wall structure units includes an air passage feature such that the air passage feature of adjacent ones of said wall structure units jointly form an air passage extending at least partially along a height of the wall structure, wherein a bottom portion of the wall structure is engaged with the flooring support structure, wherein the air passage of the wall structure has adjoining horizontal and vertical air passage spaces, wherein the air passage of the wall structure is interconnected with the air passage of the flooring support structure, wherein the flooring support structure is bordered by the wall structure and wherein the air passage extending at least partially along the height of the wall structure includes a plurality of discrete air passage paths formed within the wall structure through adjacent ones of said wall structure units;

a roof structure including an air passage extending at least partially therethrough, wherein the roof structure is engaged with a top portion of the wall structure and wherein the air passage of the roof structure is interconnected with the air passage of the wall structure; and a plurality of underground heat exchangers each configured for having air passed therethrough and for extracting heat from said air, wherein an air outlet of a first one of said underground heat exchangers is located within a space jointly encompassed by the flooring support structure, the wall structure and the roof structure, wherein an air inlet of a second one of said underground heat exchangers is located within the space jointly encompassed by the flooring support structure, the wall structure and the roof structure and wherein an air outlet of the second one of said underground heat exchangers is interconnected with at least one of the air passage of the flooring support structure and the air passage of the wall structure.

7. The apparatus of claim 6, further comprising:
a solar heat exchanger configured for having air passed therethrough and for adding heat to said air, wherein an air inlet of the solar heat exchanger is exposed outside of the space jointly encompassed by the flooring support structure, the wall structure and the roof structure and wherein an air outlet of the solar heat exchanger is exposed within the space jointly encompassed by the flooring support structure, the wall structure and the roof structure.

8. The apparatus of claim 7, further comprising:
an air discharge assembly connect to the air passage of the roof structure, wherein the air discharge assembly is operable for selectively enabling air to be discharged from the air passage of the roof structure to an ambient atmosphere and to the space jointly encompassed by the flooring support structure, the wall structure and the roof structure and wherein the air discharge assembly is mounted on the roof structure at a vertical position higher than where the wall structure is connected to the roof structure.

9. The apparatus of claim 8, further comprising:
a first valve mechanism connected to the first one of the underground heat exchangers for selectively enabling and disabling the flow of air through the first one of said underground heat exchangers;

a second valve mechanism connected to the second one of the underground heat exchangers for selectively enabling and disabling the flow of air through the second one of said underground heat exchangers; and
a third valve mechanism connected to the solar heat exchanger for selectively enabling and disabling the flow of air through the solar heat exchanger.

10. The apparatus of claim 9 wherein each one of said underground heat exchangers includes an outer housing, an air tube within the outer housing, heat sink material at least partially surrounding the air tube within the housing and a heat conductive liquid covering at least a portion of the air tube and said heat sink material.

11. The apparatus of claim 6 wherein each one of said underground heat exchangers includes an outer housing, an air tube within the outer housing, heat sink material at least partially surrounding the air tube within the housing and a heat conductive liquid covering at least a portion of the air tube and said heat sink material.

12. The apparatus of claim 11, further comprising:
a solar heat exchanger configured for having air passed therethrough and for adding heat to said air, wherein an air inlet of the solar heat exchanger is exposed outside of the space jointly encompassed by the flooring support structure, the wall structure and the roof structure and wherein an air outlet of the solar heat exchanger is exposed within the space jointly encompassed by the flooring support structure, the wall structure and the roof structure.

* * * * *